(12) United States Patent
Matteson

(10) Patent No.: US 6,570,950 B1
(45) Date of Patent: May 27, 2003

(54) NUCLEAR PLANT CONTAINMENT WITH PREFABRICATED COMPONENT SUPPORT STRUCTURE

(75) Inventor: Donn Moore Matteson, South Windsor, CT (US)

(73) Assignee: Westinghouse Electric Company LLC, Pittsburgh, PA (US)

(*) Notice: Subject to any disclaimer, the term of this patent is extended or adjusted under 35 U.S.C. 154(b) by 0 days.

(21) Appl. No.: 10/095,632

(22) Filed: Mar. 11, 2002

(51) Int. Cl.⁷ .............................................. G21C 13/024
(52) U.S. Cl. ...................... 376/461; 376/285; 376/287; 376/293; 376/295; 376/296; 376/918; 52/250; 52/251; 52/252; 52/258; 52/260; 52/300; 52/574; 52/373.1; 52/173.1; 52/378; 250/506.1; 250/515.1; 250/517.1; 250/518.1
(58) Field of Search ................................. 376/287, 293, 376/295, 285, 296, 461, 918; 52/250, 251, 252, 258, 260, 300, 373.1, 378, 173.1, 574; 250/506.1, 515.1, 517.1, 518.1

(56) References Cited

U.S. PATENT DOCUMENTS

| | | | | |
|---|---|---|---|---|
| 3,713,968 A | * | 1/1973 | Kennedy et al. ............. 376/293 |
| 3,716,451 A | * | 2/1973 | Van Sickel et al. ......... 376/461 |
| 3,916,944 A | * | 11/1975 | Crawford et al. ............ 137/376 |
| 3,979,866 A | * | 9/1976 | Prescott ....................... 376/289 |
| 4,080,256 A | * | 3/1978 | Braun et al. ................. 376/293 |
| 4,175,005 A | | 11/1979 | Harstead ...................... 176/87 |
| 4,178,729 A | | 12/1979 | Jennings ...................... 52/284 |
| 4,328,648 A | * | 5/1982 | Kalpins ....................... 52/167.4 |
| 4,673,548 A | * | 6/1987 | Betts et al. .................. 376/362 |
| 4,778,646 A | * | 10/1988 | Elter et al. .................. 376/265 |
| 4,828,792 A | * | 5/1989 | Leclercq et al. ............. 376/364 |
| 4,859,402 A | * | 8/1989 | Tupper et al. ............... 376/285 |
| 4,905,260 A | * | 2/1990 | Swidwa et al. .............. 376/203 |
| 4,919,882 A | | 4/1990 | Aul et al. .................... 376/293 |
| 5,078,956 A | | 1/1992 | Lunz ........................... 376/254 |
| 5,379,331 A | * | 1/1995 | Brouttelande ............... 376/285 |
| 5,577,085 A | * | 11/1996 | Gou et al. ................... 376/293 |
| 5,791,107 A | * | 8/1998 | Danisch et al. .............. 52/249 |

FOREIGN PATENT DOCUMENTS

| | | | |
|---|---|---|---|
| DE | 004137205 | * | 5/1992 |
| GB | 1188905 | * | 4/1970 |
| JP | 0141890 | * | 12/1978 |
| JP | 0113791 | * | 9/1979 |
| JP | 6 2070794 | * | 4/1987 |

OTHER PUBLICATIONS

Donn M. Matteson, "Prefabricated In–Core Instrumentation Chase", Proposed U.S. Patent Application Attorney Docket No. N2000–008, (Filed concurrently with present application—concurrently filed application, not prior art).

* cited by examiner

Primary Examiner—Harold J. Tudor
Assistant Examiner—John Richardson

(57) ABSTRACT

A nuclear steam supply containment system employing prefabricated component supports that are surrounded by steel concrete forms and anchored to the floor liner of a nuclear containment. The prefabricated component supports extend through the concrete forms and a reinforce concrete slab cap to a support elevation for the component. A second inner steel concrete form can be employed to form an annular concrete channel through which the supports extend. The center of the inner form can be filled with a sand-like substance, radiation absorber material or concrete grout.

15 Claims, 3 Drawing Sheets

NUCLEAR PLANT CONTAINMENT WITH PREFABRICATED COMPONENT SUPPORT STRUCTURE

This application is related to U.S. patent application Ser. No. 10/095,562 entitled "Prefabricated In-Core Instrumentation Chase," filed concurrently herewith.

BACKGROUND OF THE INVENTION

1. Field of the Invention

This invention relates generally to nuclear plant containment systems and, more particularly, to such a containment system that employs prefabricated component support structures.

2. Related Art

The primary components of a nuclear steam generating system are typically positioned within a containment structural system, which must be capable of resisting internal pressure and temperature increases caused by a Design Basis Accident, in which a loss of coolant is assumed, in combination with other loading requirements. The system must also be capable of providing radiation shielding during the entire life of the nuclear steam generating system, including a Design Basis Accident. In the past, these requirements have been met in several ways. One method is to employ a steel containment vessel supported on a concrete foundation mat. The steel containment forms a hermetically sealed vessel, which serves to provide leak tightness and resist the internal pressure. A concrete structure, separated from the steel vessel, usually surrounds the steel vessel in order to provide radiation shielding and protection for the steel vessel against the effects of tornadoes and other external loading. This outer concrete structure is usually supported on the same foundation mat as the steel vessel. During a Design Basis Accident, the steel vessel expands as it is subjected to internal pressure and temperature increases. Because of the space provided between the steel vessel and the outer concrete shell, the outer concrete structure is not significantly affected by a Design Basis Accident. However, both structures must be capable of withstanding seismic loads, which may be assumed to be coincident with a Design Basis Accident.

Another method employs a concrete structure, which provides the primary structural resistance to all imposed loads. The interior of the concrete structure is lined with a membrane, usually metallic, in order to provide resistance to leakage. During a Design Basis Accident, any pressure load is passed to the concrete structure, which is usually reinforced with steel bars, or pre-stressed by means of tendons, or a combination of both. A third type of composite containment is described in U.S. Pat. No. 4,175,005 and employs a combination of the two foregoing systems, i.e., a steel vessel and a lined concrete structure.

The major primary system components housed within the containment include the reactor pressure vessel, steam generators, pressurizer and main coolant pumps. These components are supported at different elevations on concrete pedestals that are poured over the liner floor above the base mat. The component supports are anchored to reinforcing bars within the concrete pedestals and extend above reinforced concrete floors to an elevation that maintains the components above the floor level. Desirably, to optimize flow, the respective components are maintained at an elevation above the core of the reactor. The extremely large amount of concrete that has to be poured, even before the components can be positioned, creates the critical path for new plant construction that can take six or more years. Reducing the construction time can considerably bring down the cost of nuclear plant construction.

Accordingly, alternate construction techniques are desired that can shorten the construction time of new plants.

SUMMARY OF THE INVENTION

These and other objects are achieved by a containment system for a nuclear reactor steam supply system with one or more primary components having a metal liner, a component support leg for supporting a primary component and an outer metal form surrounding the component support leg. The metal liner has a floor, side walls and a ceiling, which surround the nuclear steam supply system and forms a hermetically sealed compartment when an access hatch in the liner is latched in a closed position. The component support leg has one end that is directly affixed to the floor of the liner and is embedded in concrete. The component support leg extends substantially vertically to a first elevation at which the primary component is to be supported. The outer metal form contacts the concrete in which the one end of the component support leg is embedded. The outer metal form has one end affixed to the floor of the liner and extends substantially vertically to an elevation below the first elevation. Preferably, the outer metal form is capped by a reinforced concrete floor through which the component support leg extends vertically to a pre-selected component support elevation. The space between the form and the component support leg can be filled with a sand-like substance, radiation absorber material or concrete grout.

The component support leg and surrounding form can be fabricated in multiple lengths that are assembled by bolts and/or welding prior to placement in the containment system. Members perpendicular to the major axis of a support structure can be used to increase the load spreading capacity in the surrounding concrete.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
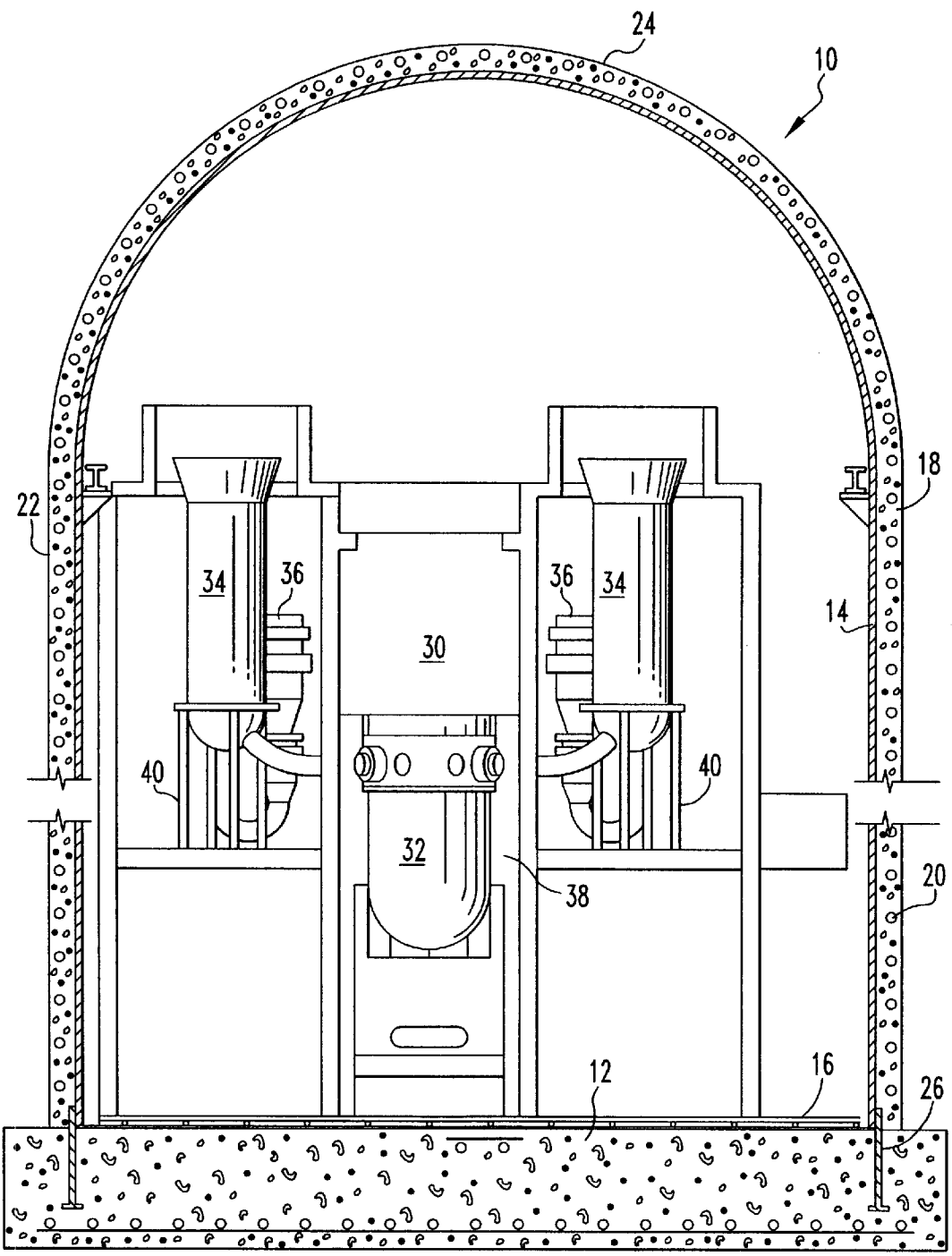
FIG. 1 shows an elevational, cross sectional view of a containment system.

FIG. 1 shows a cross section of a reactor containment system that reveals the nuclear steam supply system within. The containment system 10 is seated and supported on a base mat 12 of reinforced concrete. The containment shell is formed from a hermetically sealed steel vessel 14 having a floor 16 that is fastened to the base mat 12 through anchors 26 that tie into the reinforcing bars within the base mat. The sealed vessel 14 includes cylindrical walls 22 that are capped by a dome top 24. The steel vessel or liner 14 is surrounded by a concrete shell 18 that is reinforced with steel bars 28 and pre-stressed by means of tendons 20.

The containment system 10 encloses the nuclear steam supply system 30 having, as its primary components, a reactor vessel 32, steam generators 34, pumps 36 and a pressurizer not shown, all connected by the primary loop piping. The reactor vessel 32 contains a core of fissile material that sustains the nuclear reaction when activated by a neutron source. The fissionable reactions heat a coolant flowing through the core. The coolant is then driven by the main coolant pumps 36 to the steam generators 34 that extract the heat in the form of steam which is then employed to drive a turbine generator system. The coolant is then recirculated through the core of the vessel 32.

The pressure vessel 32 is supported within a concrete well 38 that can extend up from the liner 16 to an elevation well over 30 feet (9.14 meters). The other major nuclear steam supply system components, the steam generators 34, the pressurizer and the pumps 36 are maintained at elevations above the core for flow purposes and to assure the core is not drained in the event of a coolant piping break. The elevated component support pedestals and wall structures shielding the components are all constructed of reinforced concrete. Thus, it can be appreciated that a critical path for new plant construction includes the concrete interior of the reactor building. The primary components transfer large loads to the concrete at the interface point with the building and require a large amount of reinforcement in those concrete structures.

Figure 3:
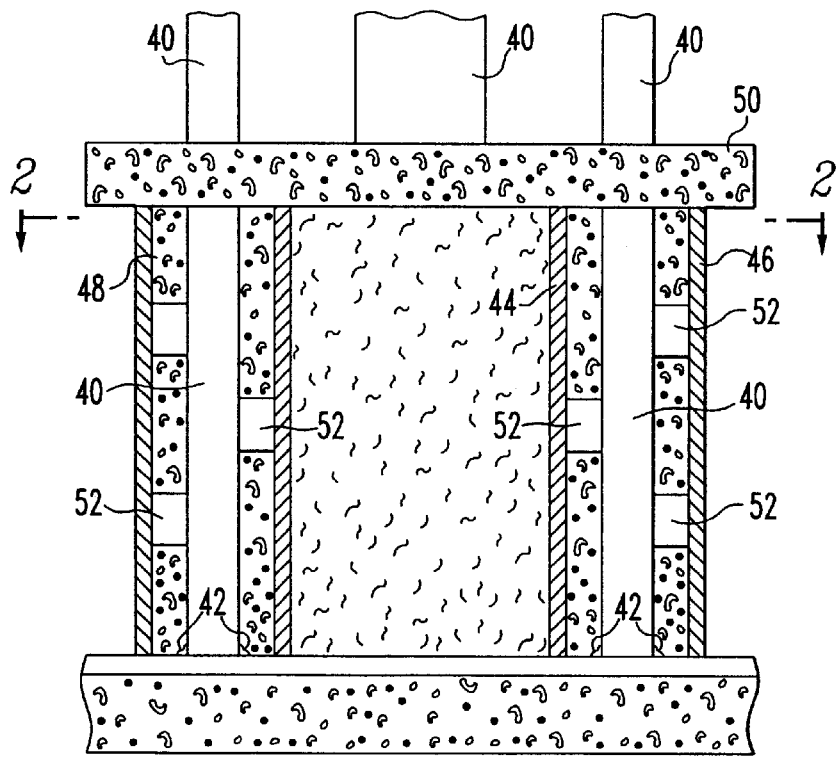
FIG. 3 is a side sectional view of the component support legs shown in FIG. 2.

In accordance with this invention, component support legs 40 are prefabricated and attached to the bottom of the containment vessel liner plate 16, for example by welding or bolting as figuratively represented by Reference Character 42 in FIG. 3, before starting the concrete pour. The component support legs 40 can be precisely aligned for the attachment of the component to be supported. The component support legs 40 are then encircled by an outer metal form 46, preferably constructed of steel. As used herein, a 'form' or a "metal form" or a "steel form" refers to a wall that provides a shape to concrete after the concrete is poured against the wall. The component support legs 40, used in conjunction with the left in place steel form 46, will reduce the amount of reinforcing bar required in the concrete and thereby decrease the time to complete the interior concrete structures.

Desirably, a second inner form 44 is used to create an annular opening 48 between the forms 44 and 46 in which the component support legs 40 are disposed. The concrete would then be poured into the annular opening 48 and the interior of the inner form 44 can be filled with a sand-like substance, radiation absorber material, or concrete grout. The top of the form is then capped with a reinforced concrete slab 50 that acts as a floor. The component support legs 40 protrude upwardly through the concrete slab 50 to the elevation at which they are designed to support the component.

Figure 2:
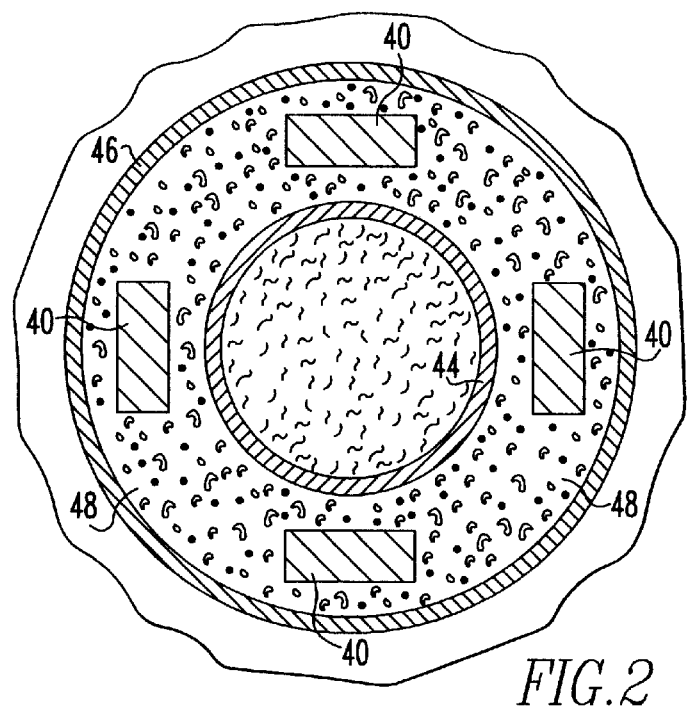
FIG. 2 is a top sectional view of component support legs embedded in concrete taken below upper floor level along the lines II—II of FIG. 3.

FIG. 2 shows a cross sectional view of the support arrangement illustrated in FIG. 3 taken just below the concrete slab 50. Though it should be appreciated, that while circular forms 44 and 46 are shown, the shape of the forms can be almost any design, such as a rectangle. The prefabricated supports used in conjunction with left in place steel forms 44 and 46 reduce the amount of reinforcing bar required in the concrete and the amount of concrete that has to be poured, thereby decreasing the time to complete the interior concrete structures. A similar method can be used to fabricate the structure supporting each of the major primary nuclear steam supply system components.

The component support legs 40 and/or the forms 44 and 46 can be fabricated in multiple lengths that are assembled by bolts or by welding prior to placement in the prescribed location within the reactor building. Additionally, member 52 joined at an angle to the major axis of the component support legs 40 can be used to increase the load spreading capacity into the surrounding concrete.

Figure 5:
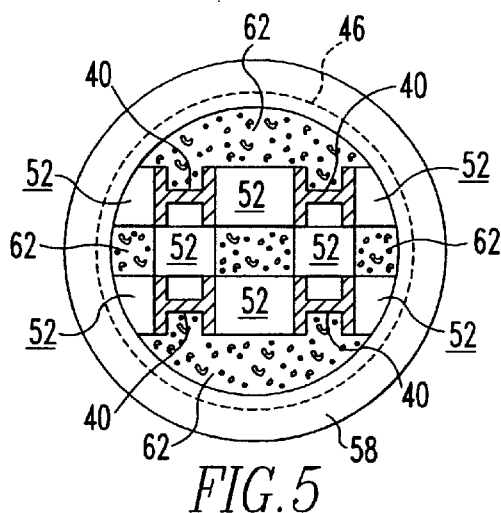
FIG. 5 is a top sectional view of the component support legs of the second embodiment illustrated in FIG. 4 taken along the lines V—V thereof.
Figure 4:
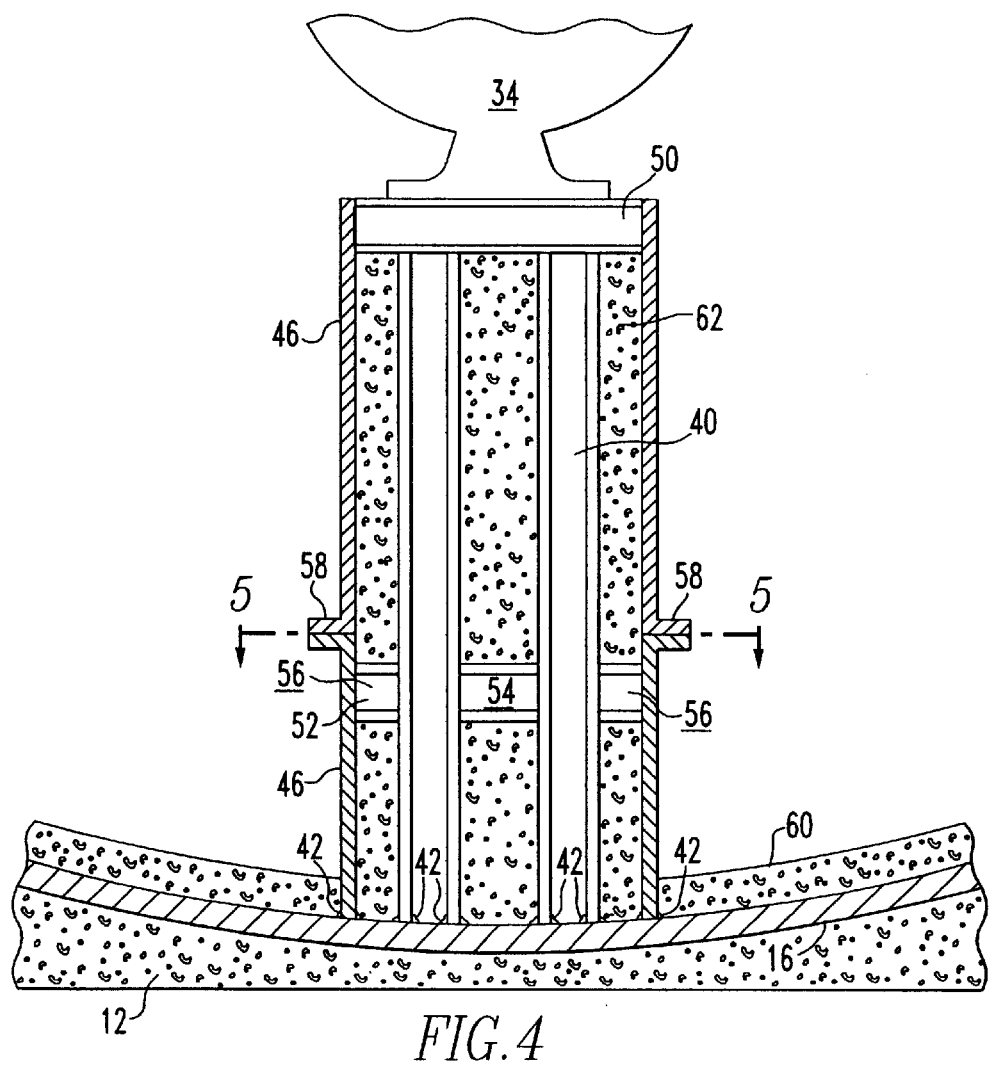
FIG. 4 is a side sectional view of a portion of a containment system incorporating a second embodiment of this invention.

FIG. 4 illustrates a variation on the embodiment illustrated in FIGS. 2 and 3. The containment steel liner 16 is shown in concave form to better resist the internal pressure within the containment shell. The liner 16 is seated on a matching curvature on the surface of the base mat 12. The outer form 46 is provided in two separate vertical sections that are joined at a seam 58 by either bolting or welding. It should be appreciated that the steel component support legs 40 (which may be I-beams as shown) can similarly be provided in two or more sections for ease of transport, and joined at the installation site. The steel form 46 and the vertical component support legs 40 are affixed to the containment liner 16 by weld joints 42. Though it should be appreciated that other fastening methods can be employed for joining the component support legs 40 and steel form 46 to the liner 16 such as by bolting. In this embodiment, each of the vertical component support legs 40 are tied together by horizontal I-beams 54 which are welded at their ends to adjacent component support legs 40 and the component support legs 40 are, in turn, tied by similar horizontally positioned I-beams 56 to the steel form 46 to spread the load. The remainder of the area within the steel form 46, below the upper floor reinforced concrete slab 50, can be filled with non-reinforced concrete or other material such as sand for radiation shielding. The construction is completed with the pouring of the lower interior concrete floor 60, which can assume the shape of the liner or be poured to a level surface. FIG. 5 shows a cross section of FIG. 4 taken along the lines V—V thereof just above the horizontal I-beam supports 52. From FIG. 5, one can better appreciate how each of the vertical component support legs 40 are tied to each other and to the steel form 46. The horizontal I-beam supports 52 can be attached to each of the vertical I-beam supports 40 and to the surrounding steel form 46 by welding or bolting.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A containment system for a nuclear reactor steam supply system with a primary component, the containment system comprising:

a metal liner, having a floor, side walls and a ceiling, the metal liner surrounding the nuclear steam supply system and forming a hermetically sealed compartment when an access hatch in the liner is latched in a closed position;

a component support leg having one end directly affixed to the floor of the liner and embedded in concrete, the component support extending substantially vertically to a first elevation at which a primary component is to be supported; and an outer metal form that surrounds the component support leg and contacts the concrete in which the one end of the component support is embedded, the outer metal form having one end affixed to the floor of the liner, the outer metal form extending substantially vertically to an elevation below the first elevation.

2. The containment system of claim 1 including an inner metal form that is positioned within the outer metal form and having an end affixed to the floor of the liner and extending substantially vertically to an elevation below the first elevation, the component support leg extending vertically within an annular space between the inner and outer forms.

3. The containment system of claim 1 wherein the component support leg is prefabricated.

4. The containment system of claim 3 wherein the component support leg is prefabricated in a plurality of sections that are joined at a site where the containment system is erected.

5. The containment system of claim 4 wherein the plurality of sections of the component support leg are joined by bolting or welding.

6. The containment system of claim 1 wherein the component support leg and the outer form are affixed to the floor of the liner by bolting or welding.

7. The containment system of claim 2 wherein the annular space between the inner and outer forms is filled with concrete.

8. The containment system of claim 7 wherein the concrete is reinforced with steel bars or rods.

9. The containment system of claim 7 including a metal member affixed to the component support leg and extending outwardly from the component support leg and within the annular space between the inner and outer forms to increase the load spreading capacity into the surrounding concrete.

10. The containment system of claim 2 wherein the inner form encloses a space and the enclosed space is filled with a medium that absorbs radiation generated by a nuclear reaction.

11. The containment system of claim 10 wherein the radiation absorbing medium is selected from the group comprising grout or sand.

12. The containment system of claim 1 including a reinforced concrete floor constructed over the top of said outer form, through which the component support leg extends to the first elevation above the reinforced concrete floor.

13. The containment system of claim 1 including a metal member affixed to the component support leg and extending substantially horizontally toward the outer metal form and affixed to an inside surface of the outer metal form.

14. The containment system of claim 13, including a plurality of component support legs and a cross member affixed to and extending between at least two of the component support legs.

15. The containment system of claim 1 including a plurality of component legs and a cross member affixed to and extending between at least tow of the component legs.

* * * * *